US006287379B1

(12) United States Patent
Khalifeh

(10) Patent No.: US 6,287,379 B1
(45) Date of Patent: Sep. 11, 2001

(54) APPARATUS AND METHOD FOR DISPOSING RUBBER WASTE MATERIAL DURING THE MANUFACTURING OF PRODUCTS WHICH ARE HEATED IN A ROTARY KILN

(76) Inventor: Jack Khalifeh, 600 N. Bundy Dr., Los Angeles, CA (US) 90049

(*) Notice: Subject to any disclaimer, the term of this patent is extended or adjusted under 35 U.S.C. 154(b) by 0 days.

(21) Appl. No.: 09/329,605

(22) Filed: Jun. 10, 1999

(51) Int. Cl.$^7$ ................................................ C04B 7/36
(52) U.S. Cl. ................................................... 106/745
(58) Field of Search ........................ 106/745; 432/103, 432/109

(56) References Cited

U.S. PATENT DOCUMENTS

| | | | |
|---|---|---|---|
| 3,779,183 | 12/1973 | Brion | 110/18 R |
| 3,925,091 | 12/1975 | Yoshida et al. | 106/100 |
| 3,946,680 | 3/1976 | Laman | 110/18 C |
| 4,081,285 | 3/1978 | Pennell | 106/100 |
| 4,256,503 | * 3/1981 | Tsuda et al. | |
| 4,295,823 | 10/1981 | Ogawa et al. | 432/106 |
| 4,298,393 | 11/1981 | Brachthauser et al. | 106/100 |
| 4,627,877 | 12/1986 | Ogawa et al. | 106/100 |
| 5,122,189 | 6/1992 | Garrett et al. | 106/745 |
| 5,156,676 | 10/1992 | Garret et al. | 106/745 |
| 5,470,384 | * 11/1995 | Cha et al. | |
| 5,735,948 | * 4/1998 | Cha et al. | |

FOREIGN PATENT DOCUMENTS

| | | |
|---|---|---|
| 7951701 | * 4/1980 | (AU) . |
| 1 405 294 | 9/1975 | (GB) . |
| 355053622 | * 4/1990 | (JP) . |

* cited by examiner

*Primary Examiner*—Paul Marcantoni
(74) *Attorney, Agent, or Firm*—Lawrence N. Ginsberg

(57) ABSTRACT

A method of manufacturing products which are produced using a rotary kiln to heat up raw materials introduced therein, the rotary kiln being of the type having an inlet end, an intermediate zone, a burning zone and a discharge end. The method of manufacturing includes firstly introducing raw material at an inlet end of a rotary kiln. The raw material is then passed through an intermediate zone of the rotary kiln. It is then passed through a burning zone of the rotary kiln. Waste rubber material is introduced as at least a portion of fuel while the raw material passes through the burning zone adjacent to the discharge end.

14 Claims, 1 Drawing Sheet

APPARATUS AND METHOD FOR DISPOSING RUBBER WASTE MATERIAL DURING THE MANUFACTURING OF PRODUCTS WHICH ARE HEATED IN A ROTARY KILN

BACKGROUND OF THE INVENTION

1. Field of the Invention

The present invention relates to the manufacturing of products produced using rotary kilns and more particularly, to a method and apparatus for utilizing rubber as fuel in a rotary kiln system.

2. Description of the Related Art

Vulcanized rubber waste such as industrial rubber and, in particular, tires present a disposal problem. Although considerable effort has been expended on a variety of approaches, scrap tire disposal procedures still present considerable logistic problems. Generally, many scrap tires have been disposed in landfill operations. These operations tend to create unstable landfills. No further use is made of the tire material. The tires are not biologically degradable.

Finely ground scrap rubber can be utilized in rubber reclaim processes. However, such processes are generally expensive in order to obtain the desired size of scrap rubber. Chemical procedures have also been proposed to utilize the raw material in vulcanized tires. However, to date, this has found limited acceptance.

It has also been proposed in the art to dispose of rubber base products such as industrial rubber waste and scrap tire and utilize their inherent heat value. Thus, for example, U.S. Pat. No. 3,946,680 teaches a process for burning used whole tires on a bed of particles of incombustible matter. The heat generated from the burning of the tires may be supplied to a boiler or used for other purposes.

SUMMARY OF THE INVENTION

It is therefore a principal object of the present invention to provide effective treating of waste rubber materials, which method minimizes the creation of environmental pollution and which may be utilized in different manufacturing operations.

This and other objects are achieved by the present invention which, in a broad aspect, is a method of manufacturing products which are produced using a rotary kiln to heat up raw materials introduced therein, the rotary kiln being of the type having an inlet end, an intermediate zone, a burning zone and a discharge end. The method of manufacturing includes firstly introducing raw material at an inlet end of a rotary kiln. The raw material is then passed through an intermediate zone of the rotary kiln. It is then passed through a burning zone of the rotary kiln. Waste rubber material is introduced as at least a portion of fuel while the raw material passes through the burning zone adjacent to the discharge end.

Thus, there is provided a method for disposal of scrap rubber products wherein the rubber material is utilized as a fuel source in a manufacturing process utilizing a rotary kiln. The process may be utilized in the manufacture of refractory materials, aluminum or alumina from bauxite, any various cement-making processes, or the manufacture of iron from iron ore.

The method of the present invention may be utilized, as previously mentioned, in different manufacturing processes. Thus, rotary kilns are utilized in the process for manufacturing iron wherein a mixture of coal or coke and iron ore is heated in a rotary kiln. Similarly, bauxite is heated in rotary kilns to a temperature of approximately 1,100° C. in aluminum manufacturing process. In manufacturing lime, limestone or lime hydroxide is heated in a rotary kiln to approximately 850° C. to produce lime. In the cement manufacturing process, a cement material is fed into a rotary kiln and converted into a cement clinker at a temperature range of typically between 1000–1500° C.

In a preferred aspect of the present invention, scrap rubber is utilized in a cement making process and the rubber is utilized in various portland cement clinker making operations which employ a rotary kiln. Thus, one may practice the present invention either in the wet or dry kilns; in the wet process, the materials, ground and if necessary, blended, are fed to the rotary kiln as slurry. In the semi-wet process, the slurry is converted to nodules and preheated before entering a shorter kiln. In the drying process, raw materials are ground, blended and fed to the kiln in the dry state. They may go through one or more pre-heater zones. The iron from steel radial tires used in the process of the present invention enhances the cement producing process. Iron is one of the ingredients in the raw meal.

Other objects, advantages, and novel features will become apparent from the following detailed description of the invention when considered in conjunction with the accompanying drawings.

DETAILED DESCRIPTION OF THE PREFERRED EMBODIMENTS

Figure 1:
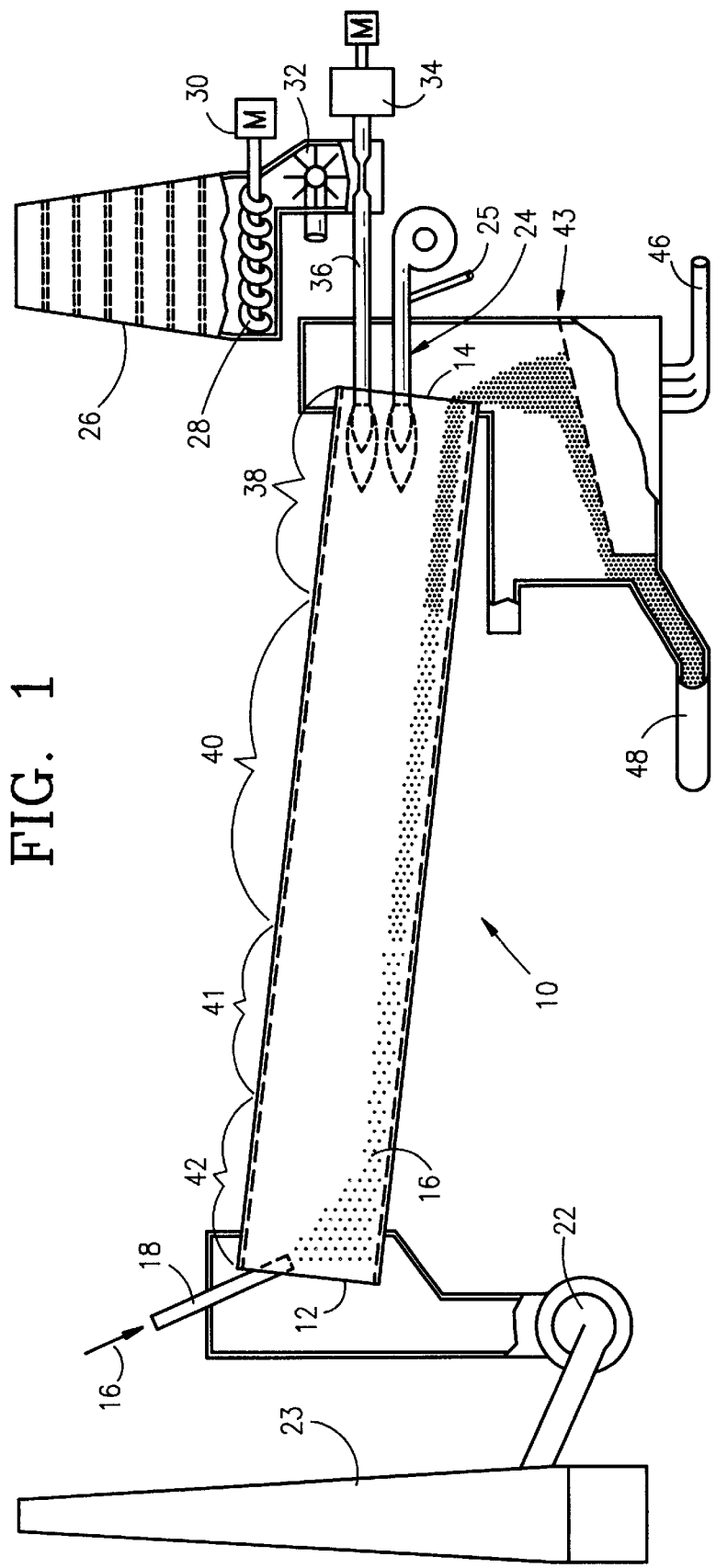
FIG. 1 is a side elevational view, partially in cross section, of a rotary kiln utilized in a cement manufacturing process in accordance with the principles of the present invention.

Referring to the drawing in greater detail, and by reference characters thereto, a cement-making installation in accordance with the present invention utilizes a rotary kiln 10 having an inlet end 12 and a discharge end 14. In the method of manufacturing, raw materials such as cement raw materials 16 are fed into inlet end 12 through a suitable inlet tube 18. Adjacent the inlet end 12 is an intermediate zone for preheating or calcining. The cement materials 16 are heated by combustion gases in the rotary kiln 10 as will become apparent from the description hereinafter. The exhaust gases are drawn off by means of an induced draft fan 22.

At discharge end 14, there is provided a fossil fuel burner 24, which may be any suitable conventional unit. Fossil fuel burner 24 includes means 25 for supplying a fossil fuel thereto along with part of the necessary combustion air. Located adjacent fossil fuel burner 24 is means for injecting waste rubber material into the discharge end of the rotary kiln. The means may comprise, as shown in FIG. 1, a storage bin 26 having approximate the base thereof, a conveying system 28. Conveying system 28 may comprise any suitable conveying system known to those skilled in the art and may typically include a belt conveyor, screw conveyor, etc. A motor 30 is provided for conveying system 28. From screw conveying system 28, which is rotatably driven by motor 30, the rubber material is fed to discharge hopper assembly 32 which may include a suitable air lock. The motor 30 regulates the quantity of waste rubber. A blower 34 then provides air that serves as both a transport medium for transporting waste rubber into the kiln and as an element for combustion. A burner pipe 36 with a nozzle is used to direct the waste rubber and air to the kiln 10 and shape the flame. The rubber material is delivered through the burner pipe 36 into the discharge end 14 of rotary kiln 10. Preferably, and as shown in FIG. 1, burner pipe 36 is located above the fossil fuel delivery system 24. The fossil fuel delivery system 24 may not be necessary if rubber waste material is pulverized fine enough to sustain combustion. The waste rubber may be shredded or pulverized waste material.

As may be seen from the above, the combination of the fossil fuel and rubber waste is delivered to the discharge end 14 of rotary kiln 10 wherein a hot burning zone, designated generally by reference numeral 38, is provided. The proportion of fossil fuel to shredded rubber waste may vary depending upon the process parameters. Generally, the proportion of rubber (in terms of total fuel energy) may vary between a minimal amount to 100% with a preferred range of 10 to 60%. As noted, the hot gases flow in a countercurrent direction to the flow of the material and thus pass through a calcining zone 40, a precalcining zone 41 and preheating zone 42 before they are withdrawn through fan 22. Exit gases from the kiln are passed through a pollution control device such as a dust collector (not shown) to remove dust and the like. The cleaned gases are then withdrawn through fan 22 and stack 23.

The apparatus may include, at the discharge end 14, a clinker cooler, designated generally by reference numeral 43. Clinker cooler 43 may include inlet means 46 for fresh air. A portion of the fresh air may be utilized as combustion air as it is drawn into kiln 10. The cooled clinker is discharged by a suitable discharge outlet 48.

The rotary kiln illustrated includes a precalcining zone 41 which may be about 200 feet long. However, shorter kilns may not include such a preheating and precalcining zone. Rotary kilns which may be used in accordance with the principles of the present invention may have lengths on the order of 50 to 350 feet.

This invention may be employed in conjunction with a wet process utilizing a long kiln, with a dry process utilizing a long kiln, a wet or dry process utilizing several stages of cyclone preheaters, precalciner and calciner and any combination thereof well known to those skilled in the art.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A method of manufacturing products which are produced using a rotary kiln to heat up raw materials introduced therein, said rotary kiln being of a type having an inlet end, an intermediate zone, a burning zone and a discharge end, said method of manufacturing comprising:

a) introducing raw material at an inlet end of a rotary kiln;

b) passing said raw materials through an intermediate zone of said rotary kiln;

c) passing said raw materials through a burning zone of said rotary kiln; and d) introducing waste rubber material as at least a portion of fuel while the raw material passes through said burning zone adjacent to said discharge end.

2. The method of claim 1, wherein said step of passing said raw material through a burning zone comprises passing said raw material through said burning zone wherein the raw material is at a temperature of at least 800° C. adjacent to said discharge end.

3. The method of claim 1, wherein said step of introducing raw material comprises introducing cement raw materials.

4. The method of claim 3, wherein said step of passing said raw material through an intermediate zone comprises passing said raw material through a calcining zone.

5. The method of claim 4, wherein said step of passing said raw material through a burning zone comprises passing said raw material through said burning zone wherein the raw material is at a temperature of at least 1,000° C. adjacent to said discharge end.

6. The method of claim 1, wherein said step of introducing said raw material at an inlet end of a rotary kiln comprises introducing the raw material at an inlet end of a rotary kiln having a length in a range of between about 50 to 450 feet.

7. The method of claim 1, wherein said step of introducing raw material at an inlet end of a rotary kiln comprises introducing the raw material at an inlet end of a rotary kiln having a length of about 200 feet.

8. The method of claim 1, wherein said step of introducing waste rubber material as at least a portion of fuel comprises introducing waste rubber material in a range of between 10 to 60% of the total fuel energy.

9. The method of claim 1, wherein said step of introducing waste rubber material comprises introducing shredded waste material.

10. The method of claim 1, wherein said step of introducing waste rubber material comprises introducing pulverized waste material.

11. The method of claim 1, wherein said step of introducing raw materials comprises introducing aluminum raw materials.

12. The method of claim 1, wherein said step of introducing raw materials comprises introducing iron raw materials.

13. The method of claim 1, wherein said step of introducing raw materials comprises introducing refractory raw materials.

14. The method of claim 1, wherein said step of introducing waste rubber material comprises introducing tire material.

* * * * *